(12) United States Patent
Hayakawa et al.

(10) Patent No.: US 6,851,509 B2
(45) Date of Patent: Feb. 8, 2005

(54) EASY-TO-ASSEMBLE STRUCTURE OF ELECTRIC POWER STEERING DEVICE

(75) Inventors: Hideyuki Hayakawa, Nishio (JP); Kenji Morikawa, Hekinan (JP); Tetsuo Imamura, Toyoake (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/634,844

(22) Filed: Aug. 6, 2003

(65) Prior Publication Data

US 2004/0060766 A1 Apr. 1, 2004

(30) Foreign Application Priority Data

| Aug. 9, 2002 | (JP) | 2002-233100 |
| Sep. 6, 2002 | (JP) | 2002-261315 |
| Sep. 12, 2002 | (JP) | 2002-266804 |
| Sep. 18, 2002 | (JP) | 2002-271987 |
| Mar. 13, 2003 | (JP) | 2003-068917 |

(51) Int. Cl.⁷ .................................. B62D 5/04
(52) U.S. Cl. .............................. 180/444; 310/71
(58) Field of Search .................. 180/444, 443; 310/71, 67 R, 68 R, 75 R, 83, 98, 99; 74/388 PS

(56) References Cited

U.S. PATENT DOCUMENTS

| 4,898,258 A | 2/1990 | Ohe et al. |
| 5,785,145 A | 7/1998 | Wakao et al. |
| 5,810,111 A | 9/1998 | Takeuchi et al. |
| 5,836,419 A | 11/1998 | Shimizu et al. |
| 5,844,386 A | 12/1998 | Matsuoka et al. |
| 6,078,155 A | 6/2000 | Tominaga et al. |
| 6,107,716 A | 8/2000 | Penketh |
| 6,123,167 A | 9/2000 | Miller et al. |
| 6,470,993 B1 * | 10/2002 | Matsuda et al. ............. 180/444 |
| 6,577,030 B2 * | 6/2003 | Tominaga et al. ......... 310/68 B |
| 6,619,421 B2 * | 9/2003 | Tanioka ...................... 180/444 |
| 6,729,433 B2 * | 5/2004 | Uryu et al. ................. 180/444 |
| 2002/0060105 A1 * | 5/2002 | Tominaga et al. .......... 180/443 |

FOREIGN PATENT DOCUMENTS

| EP | 0733536 | 9/1996 |
| EP | 0753448 | 1/1997 |
| EP | 0963900 | 12/1999 |
| JP | 64-6178 | 1/1989 |
| JP | 1-218975 | 9/1989 |
| JP | 1-154073 | 10/1989 |
| JP | 6-281513 | 10/1994 |
| JP | 8-159887 | 6/1996 |
| JP | 8-164861 | 6/1996 |
| JP | 8-175403 | 7/1996 |
| JP | 8-188164 | 7/1996 |
| JP | 8-192757 | 7/1996 |
| JP | 8-258730 | 10/1996 |
| JP | 9-24847 | 1/1997 |
| JP | 2000-6826 | 1/2000 |
| JP | 2000-203437 | 7/2000 |
| JP | 2000-313345 | 11/2000 |
| JP | 2000-318628 | 11/2000 |
| JP | 2001-16817 | 1/2001 |
| JP | 2001-112209 | 4/2001 |
| JP | 2002-120739 | 4/2002 |
| WO | WO 98/26972 | 6/1998 |

* cited by examiner

Primary Examiner—Lesley D. Morris
Assistant Examiner—Tony Winner
(74) Attorney, Agent, or Firm—Posz & Bethards, PLC

(57) ABSTRACT

An easy-to-assemble electric power steering device for automotive vehicles is provided which includes an electric motor, a controller, and a torque transmission mechanism. The controller controls a steering assist torque outputted by the motor. The torque transmission mechanism work to transmit the output of the motor to a steering shaft. The steering device also includes a support member which work to support the steering shaft and the controller within a shell. Specifically, the controller is not mounted directly on an inner wall of the shell, but retained by the support member, thus facilitating ease of electrical connection between electrical parts installed on the support member and a substrate of the controller after the substrate is mounted on the support member.

21 Claims, 15 Drawing Sheets

EASY-TO-ASSEMBLE STRUCTURE OF ELECTRIC POWER STEERING DEVICE

BACKGROUND OF THE INVENTION

1. Technical Field of the Invention

The present invention relates generally to an easy-to-assemble structure of an electric power steering device which may be employed to assist in turning a steering wheel of automotive vehicles.

2. Background Art

Typical electric power steering devices include an assemble of a torque sensor working to measure a steering torque added to a steering wheel, a controller working to determine a steering assist torque as a function of the measured steering torque, an electric motor outputting the steering assist torque as determined by the controller, and a torque transmission mechanism working to transmit the output of the electric motor to wheels to be steered. The controller has a substrate on which a switching transistor working to control a duty cycle of current flowing through the electric motor and electrical parts are fabricated. The switching transistor is not mounted directly on the substrate because of heat generated therefrom, and retained by a housing within which the torque transmission mechanism is installed. The switching transistor is soldered to the substrate. For instance, Japanese Patent First Publication No. 8-188164 discloses such a structure.

The above structure, however, has a drawback in that an assembling process of soldering the switching transistor to the substrate of the controller is separate from that of installing the torque transmission mechanism within the housing, thus resulting in a difficulty in joining the switching transistor to the substrate of the controller.

SUMMARY OF THE INVENTION

It is therefore a principal object of the invention to avoid the disadvantages of the prior art.

It is another object of the invention to provide an easy-to-assemble structure of an electric power steering device which may be used in automotive vehicles.

According to one aspect of the invention, there is provided an electric power steering device which may be employed to produce a steering assist torque in automotive vehicles. The steering device comprises: (a) an electric motor; (b) a controller including a switching transistor working to control a duty cycle of current and a control substrate to which the switching transistor is connected electrically, the controller determining a steering assist torque to be outputted from the electric motor as a function of a steering torque added to a steering shaft; (c) a torque transmission mechanism working to transmit the steering assist torque outputted from the electric motor to the steering shaft; (d) a shell within which the torque transmission mechanism is disposed; and (e) a support member working to support the steering shaft and the controller. The support member is secured within the shell.

Specifically, the controller is not retained by the shell within which the torque transmission mechanism is disposed, but held by the support member, thus permitting the switching transistor to be joined electrically to the control substrate after the control substrate is mounted on the support member. This improves assemblability of the controller. Additionally, the installation of the support member within the shell permits the support member to bear the steering shaft without need for additional parts used to support the steering shaft.

In the preferred mode of the invention, the support member has a hollow cylindrical protrusion extending in a longitudinal direction of the steering shaft. The hollowing cylindrical protrusion has an inner wall which supports the steering shaft rotatably through a bearing and an outer wall around which the control substrate is placed.

The steering device further includes a torque sensor installed on the steering shaft which works to measure the steering torque added to the steering shaft in a magnetic fashion. The support member has an inner peripheral surface facing the torque sensor. The inner peripheral surface has disposed thereon a magnetic collection member working to collect a magnetic flux produced from the torque sensor.

The controller controls the duty cycle of current supplied to the electric motor as a function of the determined steering assist torque to have the electric motor output the determined steering assist torque. The shell is made of aluminum. The steering device also includes feeder lines connecting between the electric motor and the control substrate for feeding the current to the electric motor. The feeder lines are disposed within the aluminum shell, thus minimizing a leakage of electromagnetic wave arising from control of the duty cycle of current supplied to the electric motor from the feeder lines to the outside of the shell.

The steering device further includes a motor housing within which the electric motor is disposed. The motor housing is joined to the shell so that joint of the electric motor and the feeder lines is located close to a joint of the controller and the feeder lines.

The torque sensor, the controller, the electric motor, and the torque transmission mechanism are disposed within the shell and the motor housing integrally. This permits wires connecting the torque sensor and the electric motor to the controller to be decreased in length, thus eliminating the need for additional wire harnesses.

The shell is made up of a housing to which the support member is secured and a cover closing an open end of the housing. The support member is placed in a nip formed between the housing and the cover laid to overlap with each other in a longitudinal direction of the steering shaft.

The switching transistor is installed on the support member.

The shell has formed on an inner wall thereof an extension extending in a radius direction of the steering shaft to cover a worm gear installed in the torque transmission mechanism working to reduce speed of the electric motor. The support member has an abutment portion abutting the extension of the shell.

The switching transistor is located in proximity to the abutment portion, thereby facilitating the dissipation of heat generated by the switching transistor from the support member.

The switching transistor is installed on a surface of the support member substantially opposed to the abutment portion.

The support member has a first end and a second end which are opposed to each other in a longitudinal direction of the steering shaft. The first end has the controller mounted thereon. The second end has a worm gear of the torque transmission mechanism mounted thereon. The support member is in abutment of an entire periphery thereof to an inner wall of the shell, thereby precluding entrance of grease applied to the worm gear into the controller. The inner wall of the shell also serves to position the support member in the radius direction of the steering shaft.

The torque sensor has a non-rotatable portion provided on an inner peripheral surface of the support member. This permits the torque sensor to be connected to the controller before the support member is placed within the shell.

The steering shaft includes a first shaft, a second shaft, and an elastic member which joins the first and second shafts in alignment with each other and twists subjected to input of the steering torque to one of the first and second shafts. The torque sensor includes (a) a hard magnetic member which is joined to the first shaft and produces a magnetic field therearound, (b) a soft magnetic member which is joined to the second shaft, placed within the magnetic field to form a magnetic circuit, and works to change a density of magnetic flux produced in the magnetic circuit when the soft magnetic member is changed in relative position to the hard magnetic member due to twisting of the elastic member, (c) a pair of auxiliary soft magnetic members which is disposed close to the soft magnetic member, and (d) a magnetic sensor which works to measure a density of magnetic flux flowing between the auxiliary soft magnetic members as a function of the steering torque. One of the auxiliary soft magnetic members has a magnetic flux collecting portion which is opposed to the other auxiliary soft magnetic member in a radius direction of the steering shaft and functions to collect the magnetic flux from the soft magnetic member. The magnetic sensor is disposed between the magnetic flux collecting portion and the other auxiliary soft magnetic member.

The above structure eliminates the need for directly detecting the magnetic flux produced by the hard magnetic member, thus allowing the magnetic sensor to be installed at a fixed location.

The auxiliary soft magnetic members may alternatively have magnetic flux collecting portions, respectively, which are opposed to each other in the radius direction of the steering shaft and function to collect the magnetic flux from the soft magnetic member. The magnetic sensor is disposed between the magnetic flux collecting portions, thereby avoiding increasing of the size of the torque sensor.

The auxiliary soft magnetic members are installed within a resinous mold with an opening. The resinous mold has formed therein a chamber within which the magnetic sensor is disposed. The chamber has a conical wall that increases in diameter toward the opening and serves as a guide for insertion of the magnetic sensor into the chamber when the magnetic sensor is installed within the chamber.

The magnetic sensor has terminals joined electrically to a substrate of the controller. The controller determines the steering assist torque as a function of the density of magnetic flux measured by the torque sensor.

The substrate extends perpendicular to the terminals of the magnetic sensor.

The substrate extends perpendicular to the terminals of the magnetic sensor, thereby facilitating ease of connection between the terminals of the magnetic sensor and the substrate of the controller.

According to the second aspect of the invention, there is provided an electric power steering device which comprises: (a) an electric motor; (b) a controller including a switching transistor working to control a duty cycle of current and a control substrate to which the switching transistor is connected electrically, the controller determining a steering assist torque to be outputted from the electric motor as a function of a steering torque added to a steering shaft; (c) a torque transmission mechanism working to transmit the steering assist torque outputted from the electric motor to the steering shaft; and (d) a shell made up of a housing within which the torque transmission mechanism is disposed and a cover closing an open end of the housing. The cover supports the steering shaft through a bearing and has the controller secured to an inner wall thereof so that the controller is disposed within the shell.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
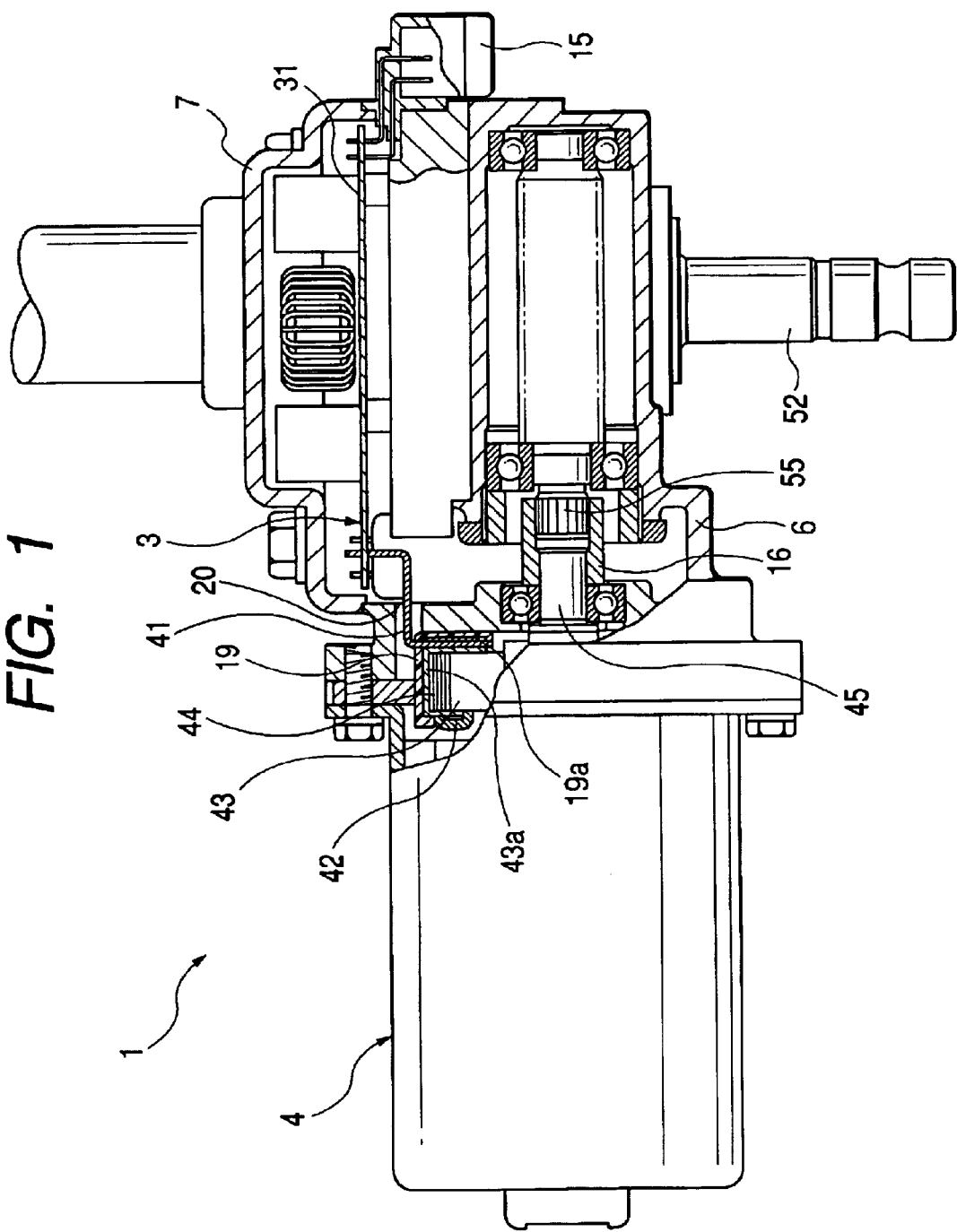
FIG. 1 is a partially sectional view which shows an electric power steering device according to the first embodiment of the invention.
Figure 2:
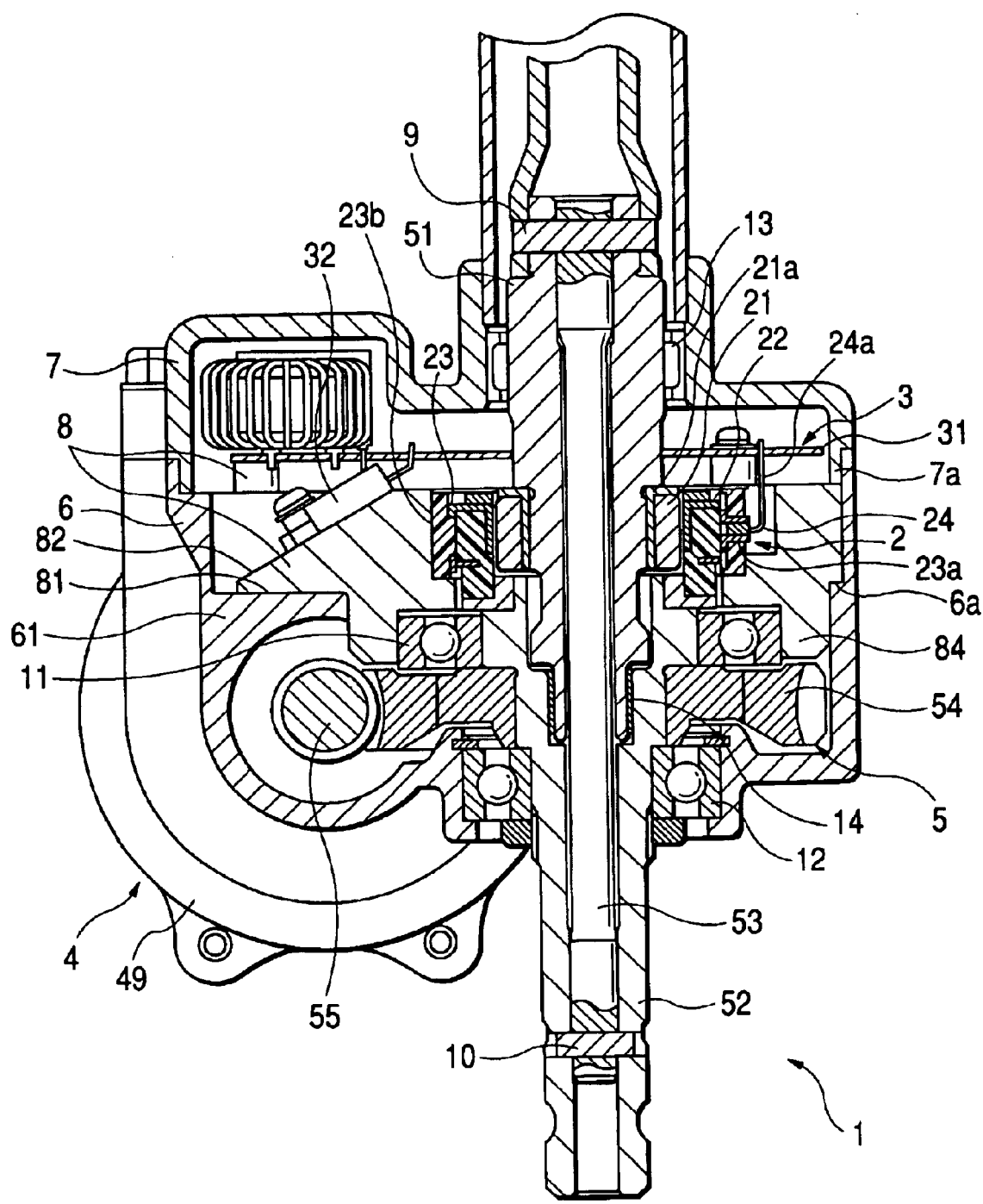
FIG. 2 is a longitudinal sectional view of the electric power steering device as illustrated in FIG. 1.

Referring to the drawings, wherein like reference numbers refer to like parts in several views, particularly to FIGS. 1 and 2, there is shown an electric power steering device 1 according to the first embodiment of the invention.

The electric power steering device 1 is installed within a cabin of an automotive vehicle and consists essentially of a torque sensor 2, a controller 3, an electric motor 4, and a torque transmission mechanism 5. The torque sensor 2, the controller 3, and the torque transmission mechanism 5 are installed within a chamber defined by a housing 6 and a cover 7. The electric motor 4 is installed within a yoke 49.

A steering shaft is made up of an input shaft 51, an output shaft 52, and a torsion bar 53 and is supported by bearings 11, 12, 13, and 14. The input shaft 51 is typically coupled with a steering wheel (not shown) and, as clearly shown in FIG. 2, disposed rotatably within the output shaft 52 through the bearing 14.

The output shaft 52 is aligned with the input shaft 51 and coupled therewith rotatably through the torsion bar 53.

The torsion bar 53 is fitted within cylindrical chambers of the input and output shafts 51 and 52 and joined thereto at ends through pins 9 and 10. The torsion bar 53 serves as an elastic member. Specifically, rotation of the steering shaft produces torque which is, in turn, applied to the input shaft 51, thereby causing the torsion bar 53 to be twisted elastically around a longitudinal center line thereof, so that the input and output shaft 51 and 52 rotate relative to each other.

The torque sensor 2 works to measure a steering torque manually added to the steering wheel by a vehicle driver and is made up of a magnet 21, a magnetic yoke 22, a pair of magnetic flux collection rings 23, and a magnetic sensor 24.

The magnet 21 is made of a ring-shaped hard magnetic material and press fit over the periphery of the input shaft 51 through a magnetic retainer 21a. The magnet 21 has N- and S-poles disposed alternately.

The magnetic yoke 22 is joined to the output shaft 52 and consists of a pair of rings each of which is made of a soft magnetic material and has as many magnetic teeth (not shown) functioning as the N-poles or the S-poles of the magnet 21 disposed on the whole periphery thereof at regular intervals. The magnetic yoke 22 is located at a given air gap from the periphery of the magnet 21 coaxially therewith. Each of the teeth of one of the rings of the magnetic yoke 22 is shifted in a circumferential direction of the magnetic yoke 22 from one of the teeth of the other ring. Specifically, each of the teeth of one of the rings of the magnetic yoke 22 is interposed between adjacent two of the teeth of the other ring. The magnetic yoke 22 is placed within the magnetic field produced by the magnet 21 to form a magnetic circuit along with the magnet 21 and works to change the density of magnetic flux flowing within the magnetic circuit when the magnetic yoke 22 is changed in relative position to the magnet 21 due to twisting of the torsion bar 52.

The magnetic flux collection rings 23 are, like the magnetic yoke 22, made of a soft magnetic material and located close to the periphery of the magnetic yoke 22. The magnetic flux collection rings 23 work as an auxiliary magnetic yoke to collect magnetic fluxes emerging from the magnet 21 through the magnetic yoke 22. The magnetic flux collection rings 23 are installed on an inner peripheral wall of a support member 8, as will be described later in detail, through a ring retainer 23b. Specifically, the magnetic flux collection rings 23 are installed integrally within the ring retainer 23b. For instance, the magnetic flux collection rings 23 are insert-molded within the ring retainer 23b. One of the magnetic flux collection rings 23 has a magnetic collection plate 23a which is formed on a circumferential end thereof and extends in the axial direction of the input and output shafts 51 and 52.

The magnetic sensor 24 is interposed between the magnetic collection plate 23a of one of the magnetic flux collection rings 23 and the other magnetic flux collection ring 23 and works to measure the density of magnetic flux flowing therethrough and output an electrical signal (e.g., a voltage signal) indicative thereof. The magnetic sensor 24 is made of a Hall IC and secured to the support member 8 through the ring retainer 23b. The magnetic senor 24 has L-shaped Hall IC terminals which extend toward the steering wheel and are soldered to a control substrate 31 of the controller 3.

In operation, when the steering torque is added to the input shaft 51, and the torsion bar 53 is twisted, it will cause the magnetic yoke 22 to change its relative position to the magnet 21 in the circumferential direction thereof. The magnetic flux produced by the magnet 21 is guided to the magnetic collection plate 23a of the magnetic flux collection rings 23 through the magnetic yoke 22. The change in relative position of the magnetic yoke 22 to the magnet 21 causes the density of magnetic flux between the magnetic collection plate 23a and the opposite magnetic flux correction ring 23 to change. The magnetic sensor 24 detects such a change as a function of the steering torque applied to the input shaft 51 and output a signal indicative thereof to the controller 3.

The controller 3 works to control the duty cycle of current flowing through the electric motor 4 as a function of the steering torque measured by the torque sensor 2 (i.e., the magnetic sensor 24).

Figure 4A:
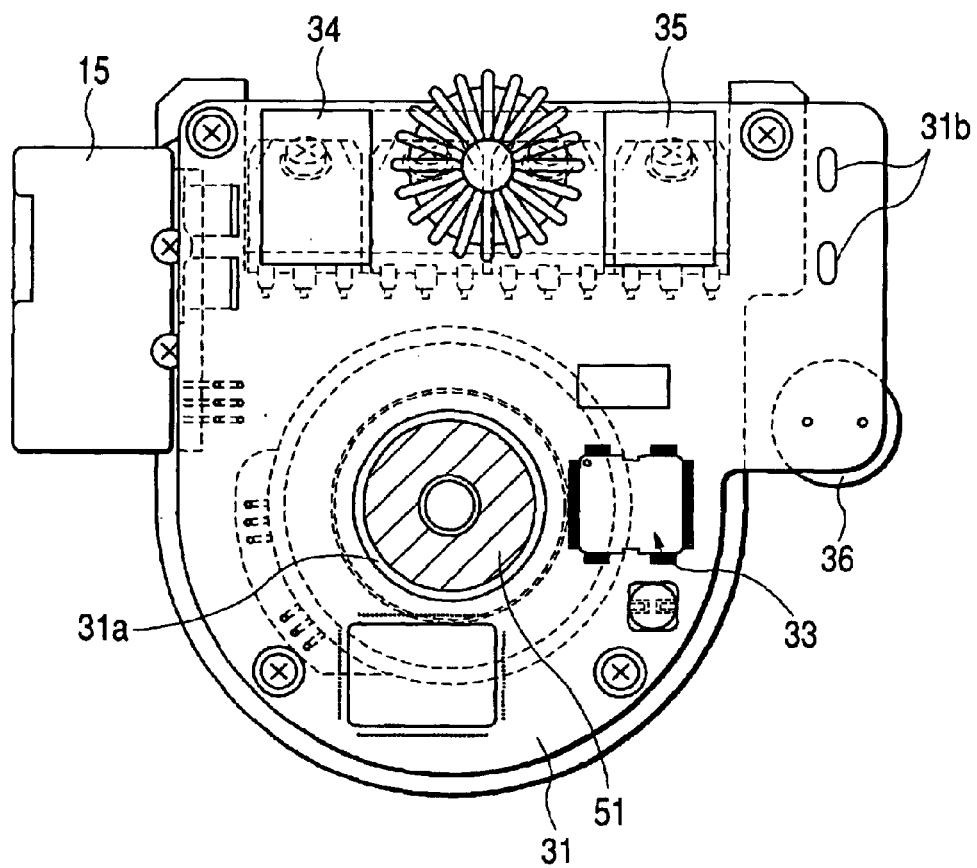
FIG. 4(a) is a front view which shows the control substrate in FIG. 3.

The control substrate 31 is, as clearly shown in FIG. 4(a), made up of a rectangular section and a semi-circular section. The semi-circular section has formed in a centeral portion thereof a hole 31a through which the input shaft 51 passes. The control substrate 31 has formed therein holes 31b to which motor terminals 41 of the electric motor 4, as shown in FIG. 1, are joined.

Figure 3:
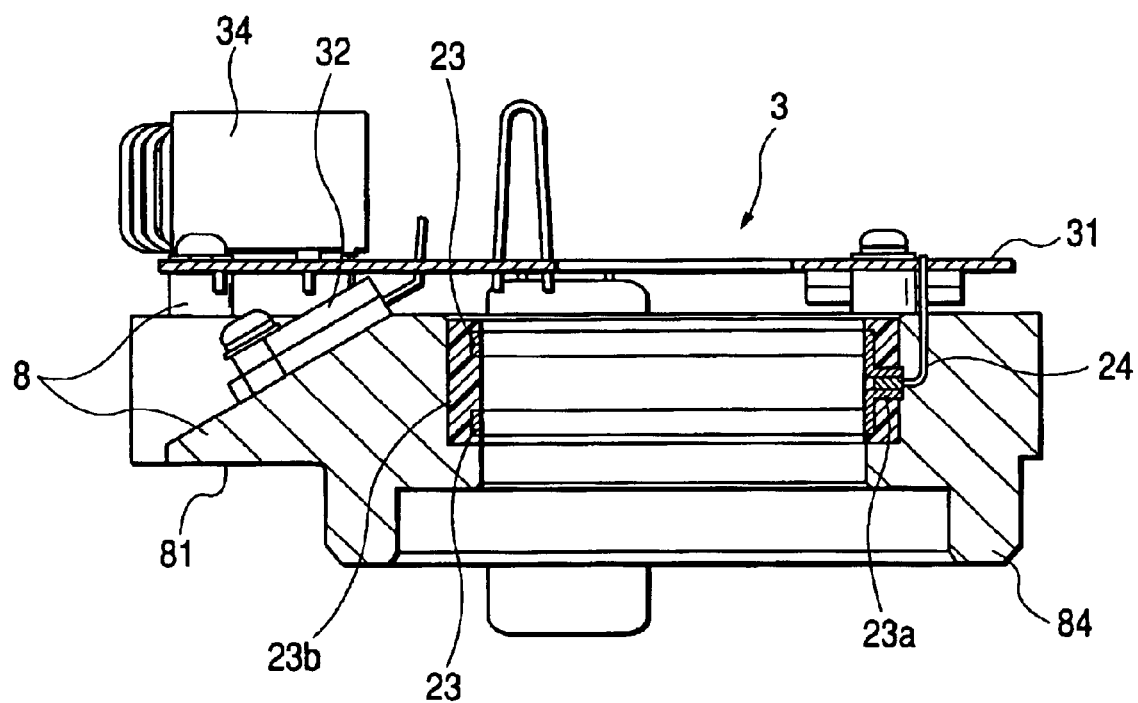
FIG. 3 is a partially longitudinal sectional view which shows a control substrate and a support member of the electric power steering device of FIG. 1.

A switching transistor 32 is, as clearly shown in FIG. 3, mounted directly on a slant surface 82 of the support member 8 through a screw. The switching transistor 32 works to control the duty cycle of current supplied to the electric motor 4. The switching transistor 32 has, as shown in FIG. 2, terminals which extend from a side wall thereof, are bent toward the steering wheel, and soldered to the control substrate 31.

The control substrate 31 has fabricated thereon, as clearly shown in FIGS. 3 and 4(a), a control device 33, relays 34 and 35, and a capacitor 36. The control substrate 31 is joined to terminals of the torque sensor 2 for reception of an output of the torque sensor 2 indicative of the steering torque.

The control device 33 is implemented by a microcomputer which determines the current supplied to the electric motor 4 as a function of the steering torque as measured by the torque sensor 2 and produce a duty-cycle controlled signal to the switching transistor 32. The relay 34 is responsive to an on/off operation of an ignition switch (not shown) of the automotive vehicle to cut the supply of the current to the electric motor 4 selectively. The relay 35 works to cut the flow of current between the switching transistor 43 and the electric motor 4 in order to avoid power generation of the electric motor 4 arising from input of the steering torque to the electric motor 4 when a drive circuit of the electric motor 4 fails. The capacitor 36 works to minimize a variation in voltage of a power supply.

Figure 5:
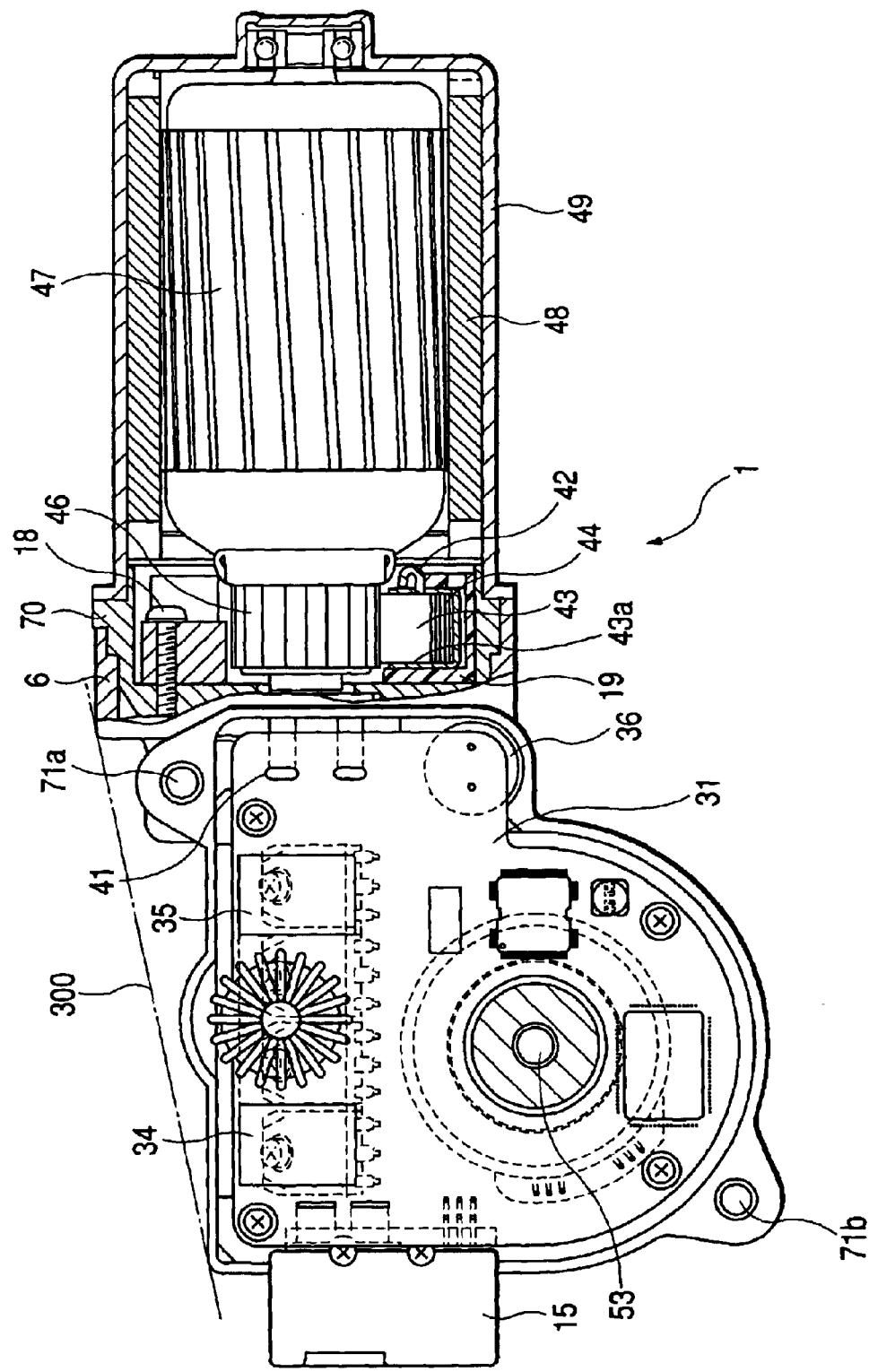
FIG. 5 is a sectional view as taken in a radius direction of the electric power steering device of FIG. 1.

The electric motor 4 works to provide torque to the output shaft 52 for assisting a vehicle operator in rotating the steering wheel. The electric motor 4 is, as shown in FIG. 5, a dc motor made up of a field, an armature 47, and brushes 43. The field has a magnet 48 installed on an inner periphery of the yoke 49 which is made of a magnetic material and serves as a motor housing. The armature 47 is supported rotatably by the inner periphery of the field. The brushes 43 are in contact with a commutator 46 installed on the armature 47. The brushes 43 are urged by springs 44 installed within brush holders 43a into constant abutment to the commutator 46. The yoke 49 has an open end attached to a side surface of the housing 6 and is secured to a frame-end 70 through a bolt 18.

The electric motor 4, as can be seen in FIG. 1, has pigtails 42 connected to the brushes 43 electrically and is equipped with metallic motor terminals 41 installed within the housing 6. The motor terminals 4 are joined to a plate 19a by resistance welding which is insert-molded in a resinous holder plate 19.

The holder plate 19 serves to retain the brush holders 43a which support the brushes 43 to be slidable and are, as shown in FIG. 5, disposed within the frame-end 70 attached to the open end of the electric motor 4. In the attachment of the electric motor 4 to the housing 6, the electric motor 4 is first inserted into the housing 6 through an opening 20.

Figure 6:
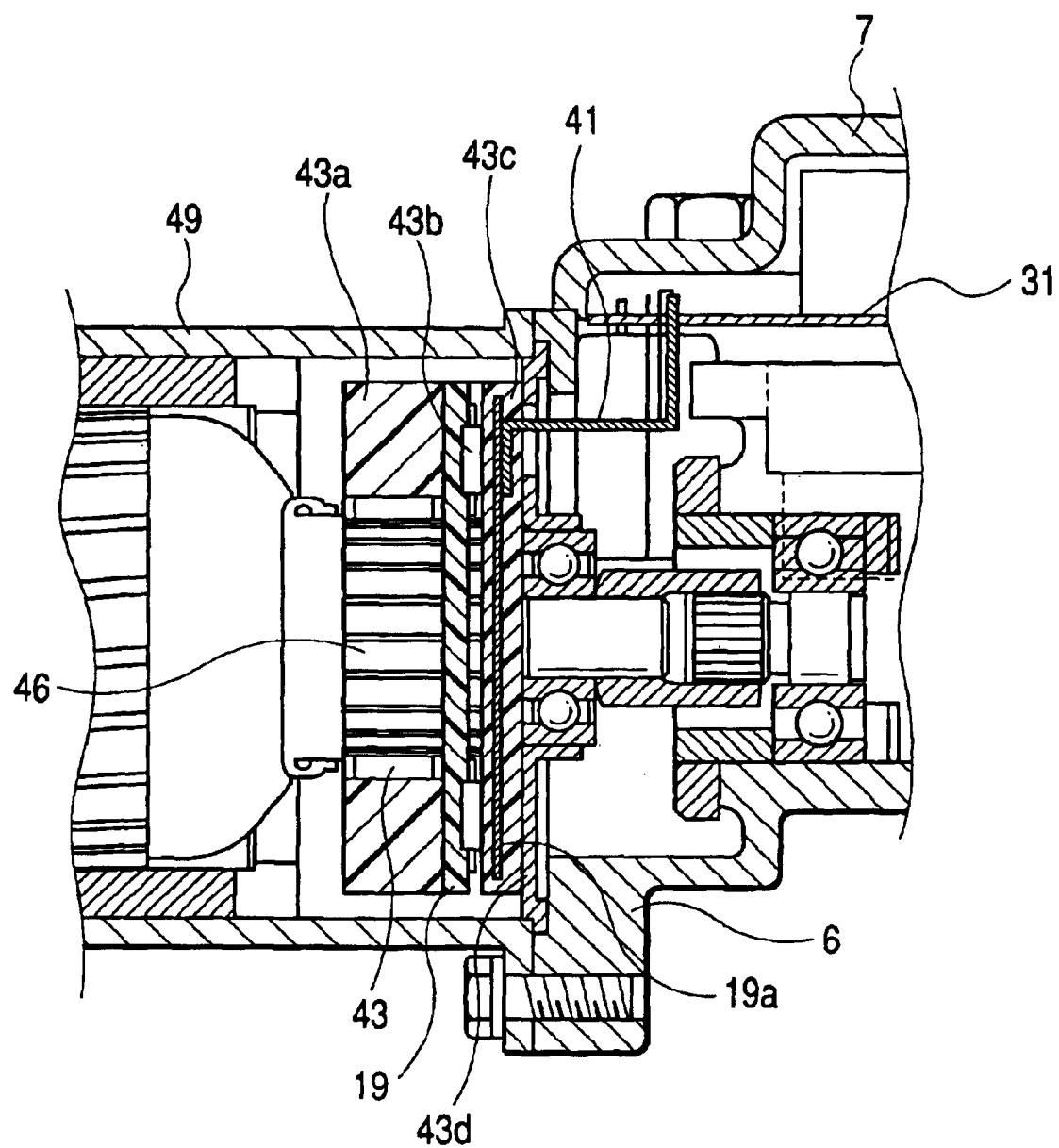
FIG. 6 is a partially sectional view which shows an electrical joint of a substrate of a controller and an electric motor.

The motor terminals 41 work to supply the power to the electric motor 4. The motor terminals 41 are bent at substantially right angles and joined at ends thereof to a terminal plate 43c, as shown in FIG. 6, retained between the end frame 43d and the brush holders 43c through a rubber mount 43b. The other ends of the motor terminals 41 are soldered to the control substrate 31 of the controller 3 after the electric motor 4 is secured to the housing 6. The yoke 49 and the housing 6 are so attached to each other as to locate the control substrate 31 close to the terminal plate 43c.

The end frame 43d is made of a metal plate and secured to the yoke 49 between the yoke 49 and the housing 6. The rubber mount 43b works to absorb vibrations arising from sliding motion of the brushes 43 on the periphery of the commutator 46. The terminal plate 43c is made of a resinous member with metal terminals disposed therein. The metal terminals connect between the motor terminals 41 and the pigtails 42 for supplying the current from the battery to the brushes 43.

The current which is determined in duty cycle by the controller 3 and adjusted by the switching transistor 32 is supplied to the armature 47 through the motor terminals 41, the plate 19a, the pigtails 42, and the brushes 43.

The torque transmission mechanism 5 works to transmit a steering assist torque produced by the electric motor 4 to wheels to be steered. The torque transmission mechanism 5 is made up of the input shaft 51, the output shaft 52, the torsion bar 53, the worm wheel 54, the worm gear 55, an armature shaft 45, and a sleeve 16. The armature shaft 45, the sleeve 16, and the worm gear 55 are aligned perpendicular to the input shaft 51, the output shaft 52, and the torsion bar 53.

The armature shaft 45 is connected to the armature 47 and smaller in diameter than the armature 47. The armature shaft 45 is press fit in the sleeve 16.

The worm gear 55 is, as can be seen in FIG. 1, rotated by an output torque of the armature shaft 45 of the electric motor 4 transmitted through the sleeve 16 fitted over the armature shaft 45. The worm gear 55 has formed in an outer surface thereof helical splines meshing with the sleeve 16.

The worm wheel 54 is, as shown in FIG. 2, installed on the periphery of the output shaft 52 and meshes with the worm gear 55 so that it is rotated by rotation of the worm gear 55.

The housing 6 defines an aluminum shell within which the torque transmission mechanism 5 and the support member 8 are disposed. The housing 6 supports the output shaft 52 rotatably through the bearing 12.

The cover 7 defines an aluminum shell which covers an open end of the housing 6 oriented in an axial direction of the steering shaft. The cover 7 has installed therein the bearing 13 which bears the input shaft 51 rotatably. When installed on the housing 6, the cover 7 urges the support member 8 into abutment to an inner wall of the housing 6. This causes the support member 8 to be placed in a nip between the end surface 7a of the cover 7 and the inner wall 6a of the housing 6. The cover 7 is affixed to, as shown in FIG. 5, flanges 71a and 71b of the housing 6. The flange 71a is located in the proximity to a line 300 of contact with an outer wall of the housing 6 and an outer wall of the yoke 49. The flange 71b is diametrically opposed to the flange 71a across the torsion bar 53.

Figure 4B:
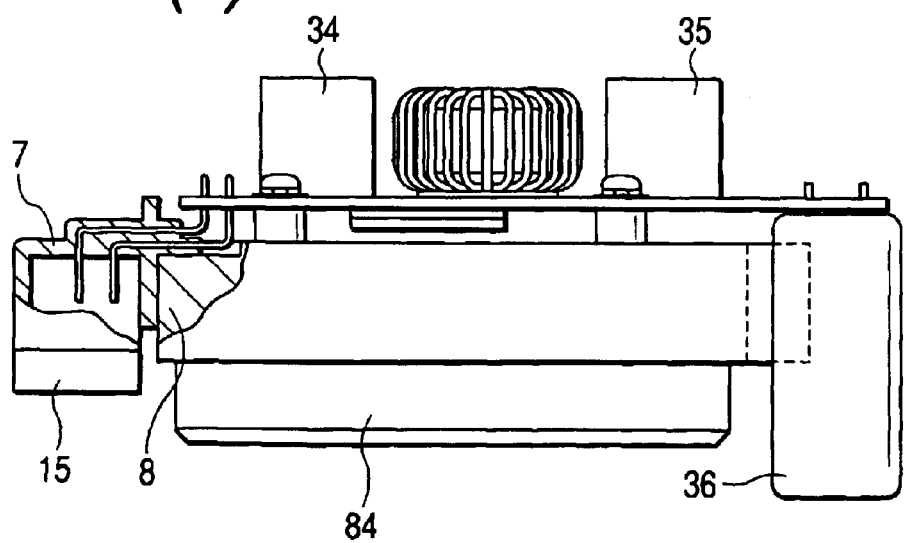
FIG. 4(b) is a side view of FIG. 4(a)

The support member 8 is made of an aluminum material and consists essentially of a cylindrical section and a rectangular parallelpiped section and disposed within a chamber defined between the housing 6 and the cover 7. The support member 8, as clearly shown in FIG. 2, bears the controller 3 at a surface thereof facing the steering wheel and is retained within the housing 6 in abutment of an opposite surface thereof to the inner wall of the housing 6. The support member 8, as already described, has the ring retainer 23b in which the magnetic flux collection rings 23 are disposed and pivots the output shaft 52 through the bearing 11. The support member 8 has a holder flange 81 abutting an extension 61 which is formed on the inner wall of the housing 6 and extending inwardly to cover the worm gear 55. The holder flange 81 has a surface opposed to the extension 61 on which the switching transistor 32 is installed. The support member 8, as shown in FIG. 4(b), has installed thereon a connector 15 which has power supply or feeder terminals leading to the battery (not shown) and signal terminals for receiving a vehicle speed signal. The support member 8 has an annular protrusion 84 formed on the end of the support member 8 facing the wheels to be steered and projects in the axial direction of the input and output shafts 51 and 52. The protrusion 84 has an outer periphery abutting the inner wall of the housing 6 as a whole and also has an inner chamber within which the bearing 11 is fitted.

The support member 8 on which the controller 3 is, as shown in FIG. 3, installed is disposed within the chamber between the housing 6 and the cover 7.

As apparent from the above discussion, the electric power steering device 1 has the controller 3 installed on the support member 8 which is independent of the housing 6 within which the torque transmission mechanism 5 is disposed, thus permitting the terminals of the switching transistor 32 to be soldered to the control substrate 31 after the switching transistor 32 and the control substrate 31 are mounted on the support member 8. This facilitates easy of installation of the controller 3 as compared with the conventional structure in which the terminals of the switching transistor 32 are soldered to the control substrate 31 after the switching transistor 32 and the control substrate 31 are mounted on the housing 6.

It is also possible to check an operation of the controller 3 installed on the support member 8 before placed in the housing 6. Specifically, there is no need for checking the operation of the controller 3 after disposed within the housing 6.

The installation of the support member 8 within the chamber defined between the housing 6 and the cover 7 enables the support member 8 to retain the output shaft 52 rotatably through the bearing 11, thus eliminating the need for an additional member for supporting the output shaft 52.

The support member 8 is made of an aluminum material and has the slant surface 82 on which the switching transistor 32 is installed directly, thus facilitating dissipation of heat generated by the switching transistor 32 from the support member 8. Additionally, the support member 8 has the holder flange 81 which is in abutment to the extension 61 of the housing 6 provided to cover the worm gear 55, thus facilitating transfer of the heat generated by the switching transistor 32 to the extension 61 through the support member 8 for dissipating the heat.

The holder flange 81 is in abutment of the surface thereof, which is opposed to the surface on which the switching transistor 32 is installed, to the extension 61 of the housing 6, thereby facilitating the dissipation of heat generated by the switching transistor 32 to the housing 6 through the support member 8, thus facilitating ease of the heat dissipation further.

The ring retainer 23 in which the magnetic flux collection rings 23 are disposed is attached directly to the inner wall of the support member 8, thus eliminating the need for an additional retainer for the magnetic flux collection ring.

The motor terminals 41 used as feeder lines to feed the power or current to the electric motor 4 are disposed in the aluminum-made housing 6, thus minimizing a leakage of electromagnetic waves generated when the controller 3 controls the duty cycle of the current flowing through the electric motor 4 to the outside of the housing 6. This minimizes adverse effects on external devices such as a radio receiver installed in the vehicle.

The yoke 49 of the electric motor 4 and the housing 6 are so fixed as to locate the control substrate 31 to which the motor terminals 41 connects close to the terminal plate 43c, thus permitting the motor terminals 41 to be shortened. This results in a decrease in electromagnetic wave arising from the control of the duty cycle of the current supplied to the electric motor 4 through the controller 3.

The torque sensor 2, the controller 3, the electric motor 4, and the torque transmission mechanism 5 are assembled integrally, thus permitting the size of the electric power steering device 1 to be decreased and wires or conductors between the torque sensor 2 and the controller 3 and between the electric motor 4 and the controller 3. The motor terminals 41 and the terminals of the magnetic sensor 24 are joined directly to the control substrate 31, thus eliminating the need for additional wire harnesses.

The rubber mount 43b is disposed between the terminal plate 43c and the brush holders 43a and works to absorb vibrations arising from sliding motion of the brushes 43 on the commutator 46 to minimize transmission of the vibrations to the terminal plate 43c, thus avoiding addition of stress caused by the vibrations to the motor terminals 41 disposed between the terminal plate 43c and the control substrate 31, thereby ensuring stability of connection between the motor terminals 41 and the control substrate 31.

The support member 8, as described above, has the protrusion 84 which is formed by a portion of the end thereof facing the wheels to be steered and projects in the axial direction of the steering shaft (i.e., the input and output shafts 51 and 52 and the torsion bar 53). The protrusion 84 has the outer periphery abutting the inner wall of the housing 6 as a whole, thereby ensuring the accuracy of positioning of the support member 8 in the radius direction of the steering shaft. This eliminates the need for increasing a clearance between the inner periphery of the magnetic flux collection rings 23 and the magnetic yoke 22 in order to avoid physical contact therebetween and also minimizes a decrease in density of magnetic flux flowing through the magnetic flux collection rings 23, thus resulting in improved accuracy of measuring the magnetic flux density in the magnetic sensor 24. The abutment of the whole of the periphery of the protrusion 84 to the inner wall of the housing 6 minimizes the intrusion of grease applied to the worm gear 55 into the controller 3 to avoid adverse effects of the grease on circuit elements fabricated on the control substrate 31.

The support member 8 is held by a nip formed by the housing 6 and the cover 7 laid to overlap in the axial direction of the steering shaft, thus eliminating an unwanted physical shift thereof in the axial direction.

The support member 8 has the magnetic sensor 34 of the torque sensor 2 and the control substrate 31 of the controller 3 installed thereon, thus permitting the Hall IC terminals 24a of the magnetic sensor 24 to be connected electrically to the control substrate 31 before they are disposed within the housing 6. This allows the operation of the controller 3 to be tested before the support member 8 is installed within the housing 6. The direct connection of the magnetic sensor 24 to the controls substrate 31 minimizes the need for wires or connectors.

The electric power steering device 1 may have grease disposed between the holder flange 81 of the support member 8 and the inner wall of the housing 6 in order to enhance the heat transmission.

The support member 8 may alternatively be made of a magnetic material, thereby decreasing magnetic noises added from outside the housing 6.

A magnetic shield may be placed between the magnetic flux collection rings 23 and the support member 8 in order to minimize an external magnetic flux flowing through the torque sensor 2 which has past through the aluminum-made housing 6 and entered the support member 8, which may cause an error in measurement of the torque sensor 2.

Figure 7:
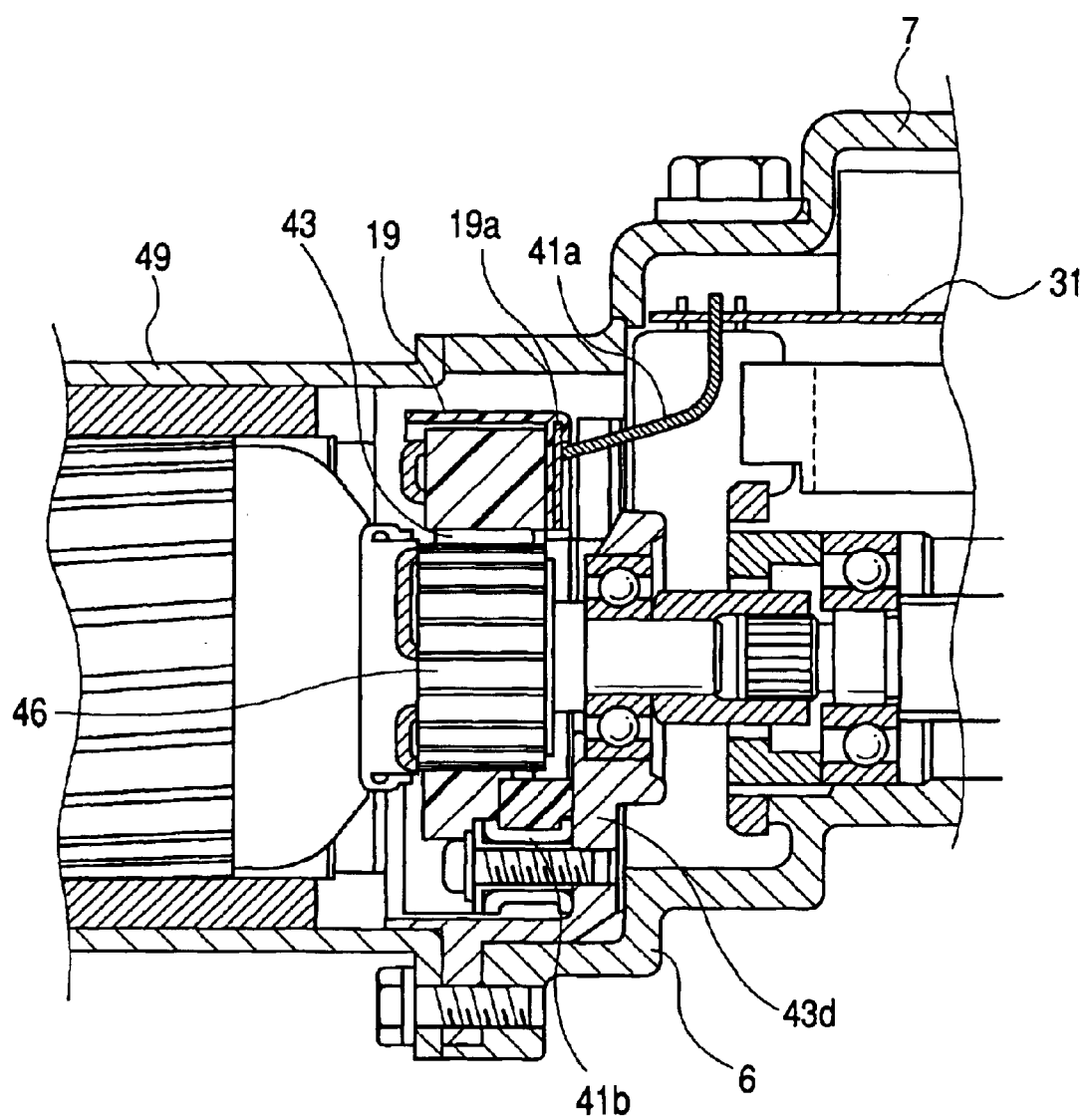
FIG. 7 is a partially sectional view which shows a modification of a joint of a substrate of a controller and an electric motor.

The control substrate 31 and the terminal plate 43c may alternatively be joined through pigtails 41a, as illustrated in FIG. 7, or coated wires (not shown) instead of the motor terminals 41. The use of such conductors prevents vibrations of the terminal plate 43c arising from, for example, the sliding motion of the brushes 43 from transmitting to the control substrate 31.

The torque sensor 2 may alternatively be of an inductance type in which a coil is used instead of the magnetic flux collection rings 23. The coil may be installed on the support member 8 to show substantially the same effects as described above.

The switching transistor 32 is mounted directly on the slant surface 82 of the support member 8, but may alternatively be installed through a metal plate.

The electric motor 4 may alternatively be implemented by a brushless motor.

Figure 8:
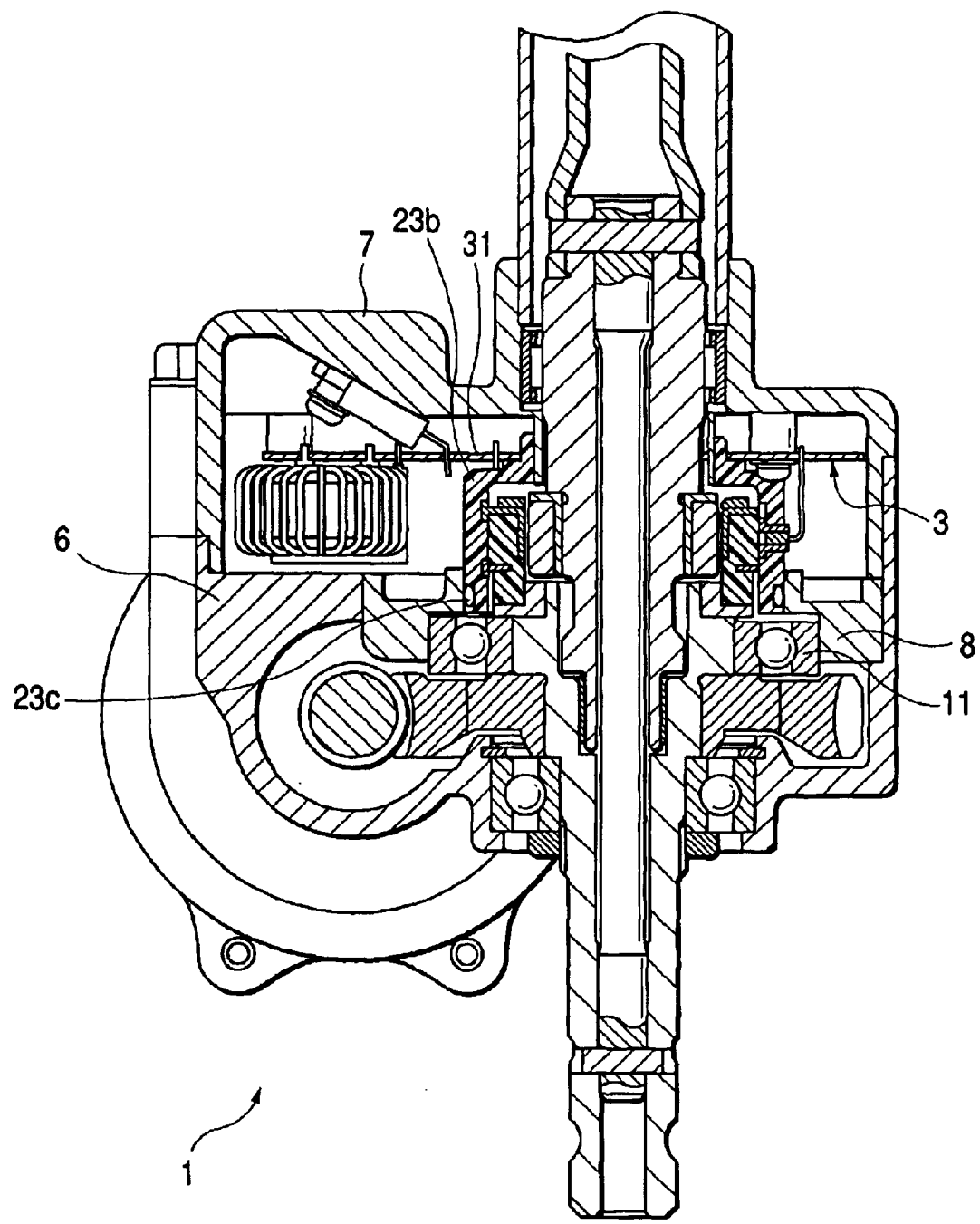
FIG. 8 is a longitudinal sectional view which shows an electric power steering device according to the second embodiment of the invention.
Figure 9:
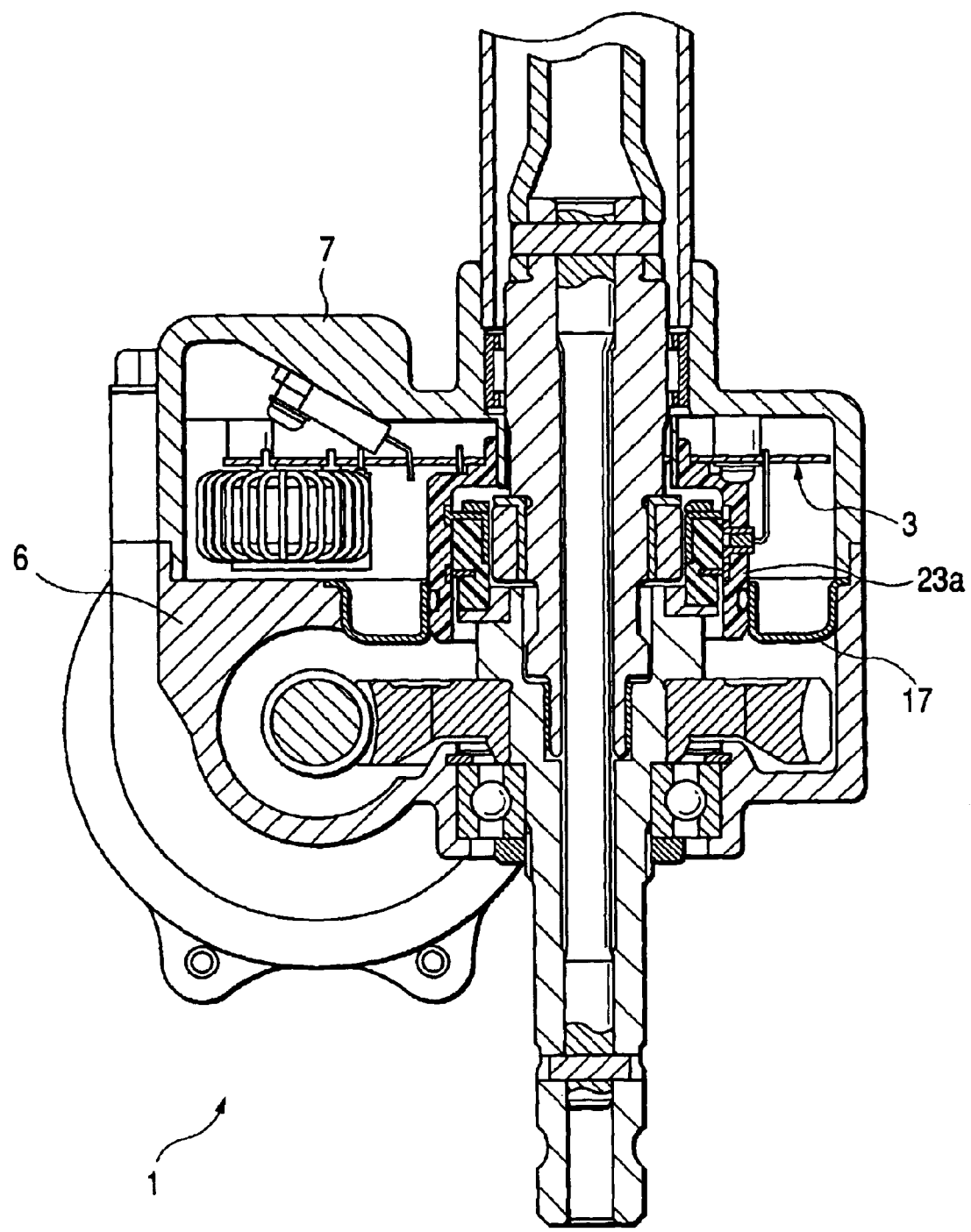
FIG. 9 is a longitudinal sectional view which shows a modified form of the electric power steering device of FIG. 8.

FIGS. 8 and 9 show the electric power steering device 1 according to the second embodiment of the invention.

The controller 3 is not mounted on the support member 8, but retained by the inner wall of the cover 7. After the controller 3 is mounted on the cover 7, the cover 7 is attached to the open end of the housing 6, so that the controller 3 is placed within a chamber defined by the housing 6 and the cover 7. The ring retainer 23b is secured to the control substrate 31. An O-ring 23c is fitted over the ring retainer 23b to preclude the entrance of grease applied to the worm gear 55 into the controller 3. After the cover 7 on which the controller 3 is mounted is joined to the open end of the housing 6, it is difficult to solder the motor terminals 41 to the control substrate 31. The motor terminals 41 are joined to the control substrate 31 through a connector (not shown). The structure of this embodiment shows substantially the same beneficial effects as those in the first embodiment.

Other arrangements are identical with those in the first embodiment, and explanation thereof in detail will be omitted here.

The support member 8 is, as clearly shown in FIG. 8, supports the periphery of the output shaft 52 through the bearing 11, but the support member 8 and the bearing 11 may be, as shown in FIG. 9, omitted if the rigidity of the steering shaft is relatively high. In this case, a partition wall 17 is preferably provided in order to preclude the leakage of grease applied to the worm gear 55 to the control substrate 31.

Figure 10:
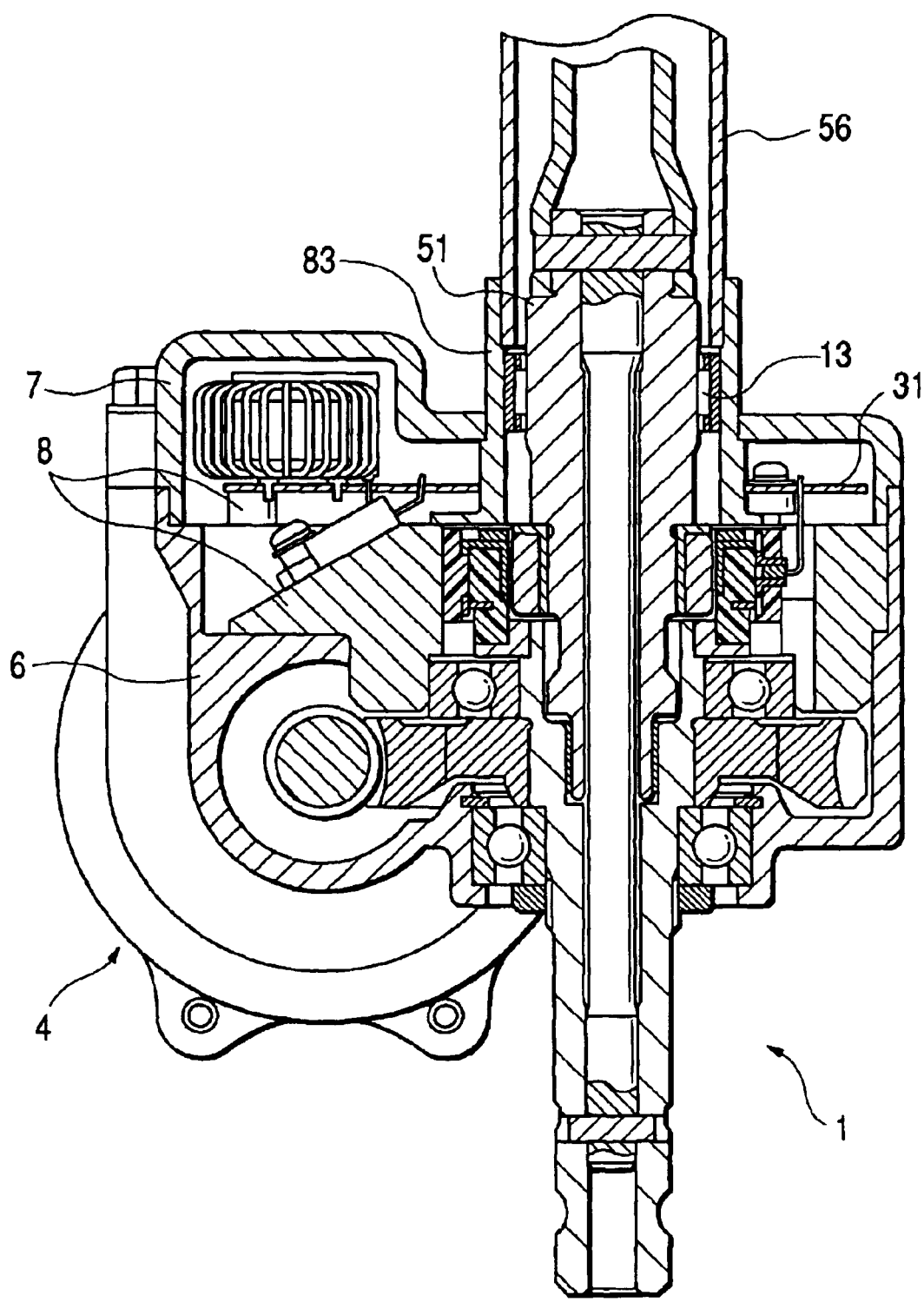
FIG. 10 is a longitudinal sectional view which shows an electric power steering device according to the third embodiment of the invention.

FIG. 10 shows the electric power steering device 1 according to the third embodiment of the invention.

The support member 8 has an extension sleeve 83 extending toward the steering wheel. The extension sleeve 83 has disposed therein the bearing 13 through which the input shaft 51 passes. The steering column 56 is partially fitted within the extension sleeve 83. The extension sleeve 82 is fitted in the cover 7 in abutment of an outer wall to the cover 7. The control substrate 3 surrounds the extension sleeve 82. This structure preclude the flow of grease contained in the bearing 13 to the control substrate 31 along the steering shaft and also minimizes a locational shift of the support member in a radius direction of the steering shaft.

Other arrangements are identical with those in the first embodiment, and explanation thereof in detail will be omitted here.

Figure 11:
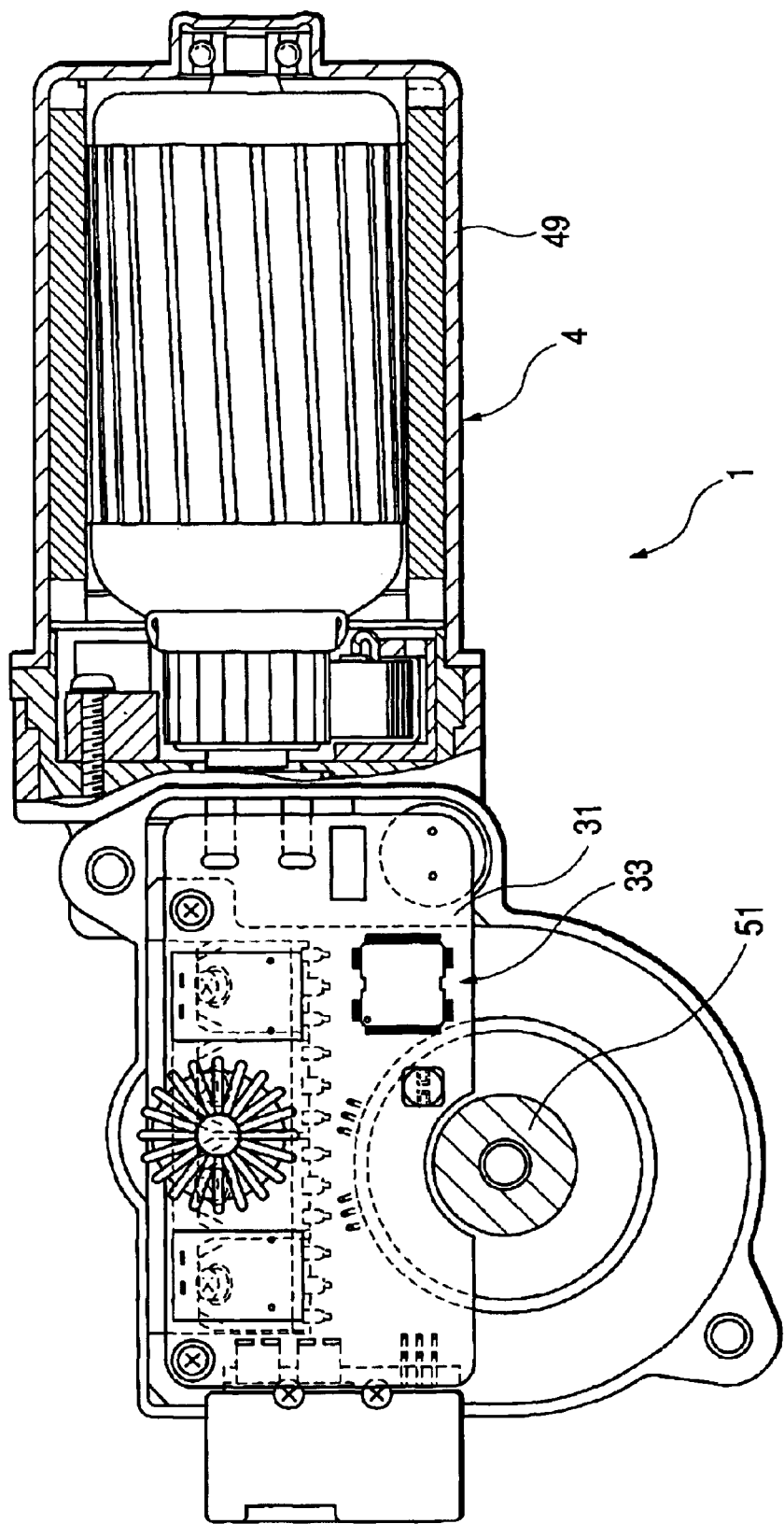
FIG. 11 is a longitudinal sectional view which shows an electric power steering device according to the fourth embodiment of the invention.

FIG. 11 is a sectional view traversing the steering shaft of the electric power steering device 1 according to the fourth embodiment of the invention.

The input shaft 51 does not pass through the control substrate 31. The control substrate 31 is made of a rectangular plate. This structure is useful in a case where the control substrate 31 has a small number of parts fabricated thereon or has a reduced size.

The control device 33, as illustrated in FIG. 11, is made of an integrated chip consisting of a microcomputer and an IC, but may alternatively have, as shown in FIG. 4, the microcomputer and the IC fabricated separately on the control substrate 31.

Other arrangements are identical with those in the first embodiment, and explanation thereof in detail will be omitted here.

Figure 12:
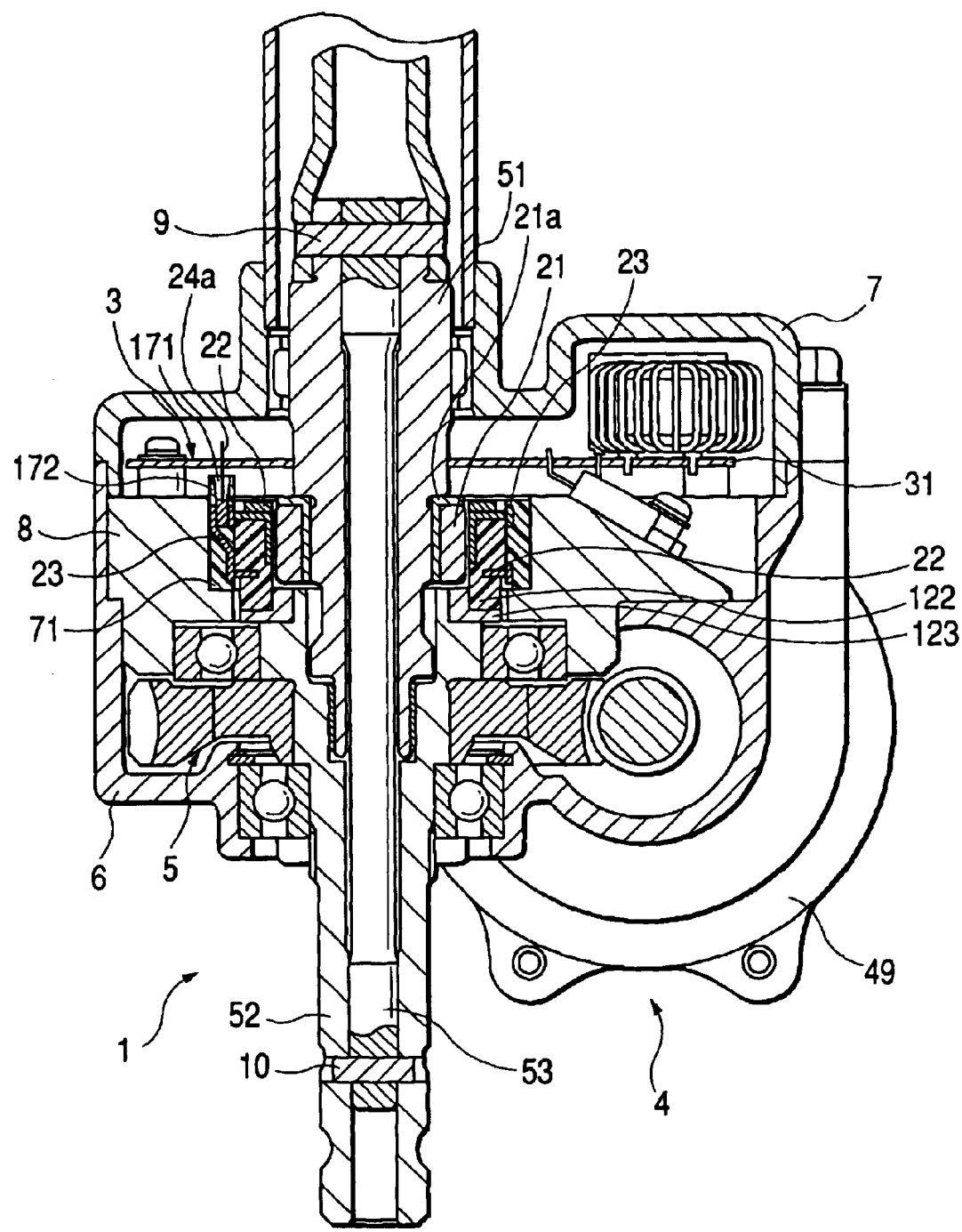
FIG. 12 is a longitudinal sectional view which shows an electric power steering device according to the fifth embodiment of the invention.

FIG. 12 shows the electric power steering device 1 according to the fifth embodiment of the invention.

The magnetic yoke 22 is, like the first embodiment, disposed within a resinous mold 122 which is press fit over the output shaft 52 through a yoke retainer 123.

Figure 13:
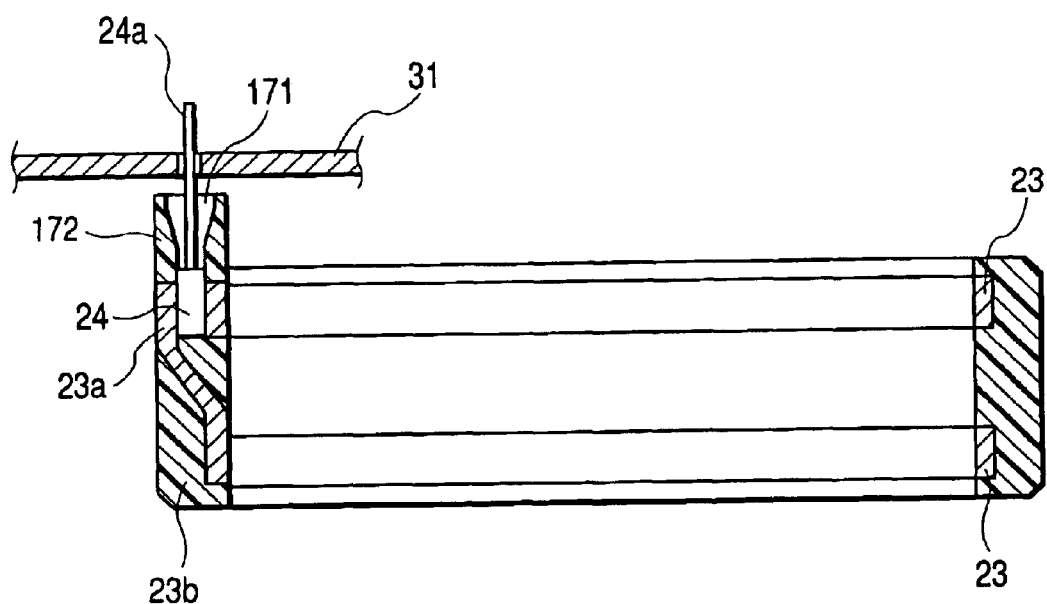
FIG. 13 is a partially enlarged sectional view which shows a structure of a torque sensor of the electric power steering device in the fifth embodiment.
Figure 14:
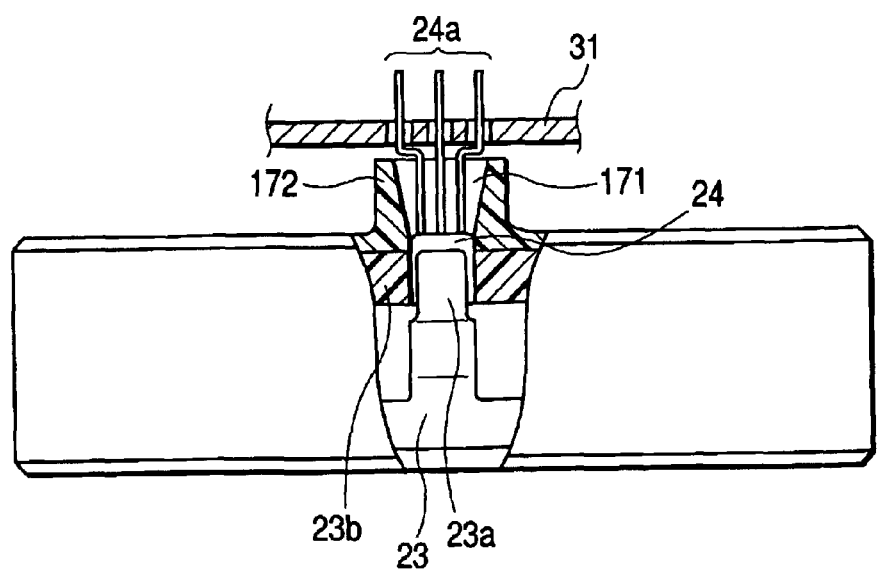
FIG. 14 is a partially sectional side view of FIG. 13.

The magnetic flux collection rings 23 are, as clearly shown in FIGS. 13 and 14, disposed within an inner wall the ring retainer 23b made of a resinous hollow cylinder. The magnetic flux collection rings 23 are laid to overlap each other in the longitudinal direction of the steering shaft. The ring retainer 23b has formed therein an open sensor mount chamber 171 within which the magnetic sensor 24 is mounted. The ring retainer 23b is secured fixedly to the inner wall of the chamber formed in the support member 8. The ring retainer 23b has a conical wall 172 formed at an open end side of the sensor mount chamber 171 which serves as a guide for facilitating ease of insertion of the magnetic sensor 24. The conical wall 172 has a diameter increasing as approaching the open end of the sensor mount chamber 171.

Installation of the magnetic sensor 24 is achieved by inserting it into the sensor mount chamber 171 in the longitudinal direction of the steering shaft and placing it between the magnetic collection plate 23a and an upper one of the magnetic flux collection rings 23 movably in the longitudinal direction. The magnetic sensor 24 has the terminals 24a extending, as clearly shown in FIG. 14, in the longitudinal direction of the steering shaft. A portion of the upper magnetic flux collection ring 23 facing the magnetic collection plate 23a is curved continuously from the remainder of the upper magnetic flux collection ring 23 and functions to collect the magnetic fluxes generated by the magnet 21 together with the magnetic collection plate 23a, but may alternatively be machined to have a flat surface opposed to the magnetic collection plate 23a in the radius direction of the magnetic flux collection rings 23.

The controller 3 monitors the torsion or torque added to the steering wheel as measured by the torque sensor 2 to control the duty cycle of the current flowing through the electric motor 4.

The control substrate 31 is placed perpendicular to the terminals 24a of the magnetic sensor 24 and retained by the support member 8. The terminals 24a of the magnetic sensor 24 are soldered to the control substrate 31 to transmit the output of the torque sensor 2 indicative of the steering torque to the controller 3. The orientation of the control substrate perpendicular to the terminals 24a of the magnetic sensor 24 permits the terminals 24a to be joined directly to the control substrate 31 without an additional bending process. This allows the terminals 24a to be shortened and results in improved assemblability of the magnetic sensor 24.

Figure 15:
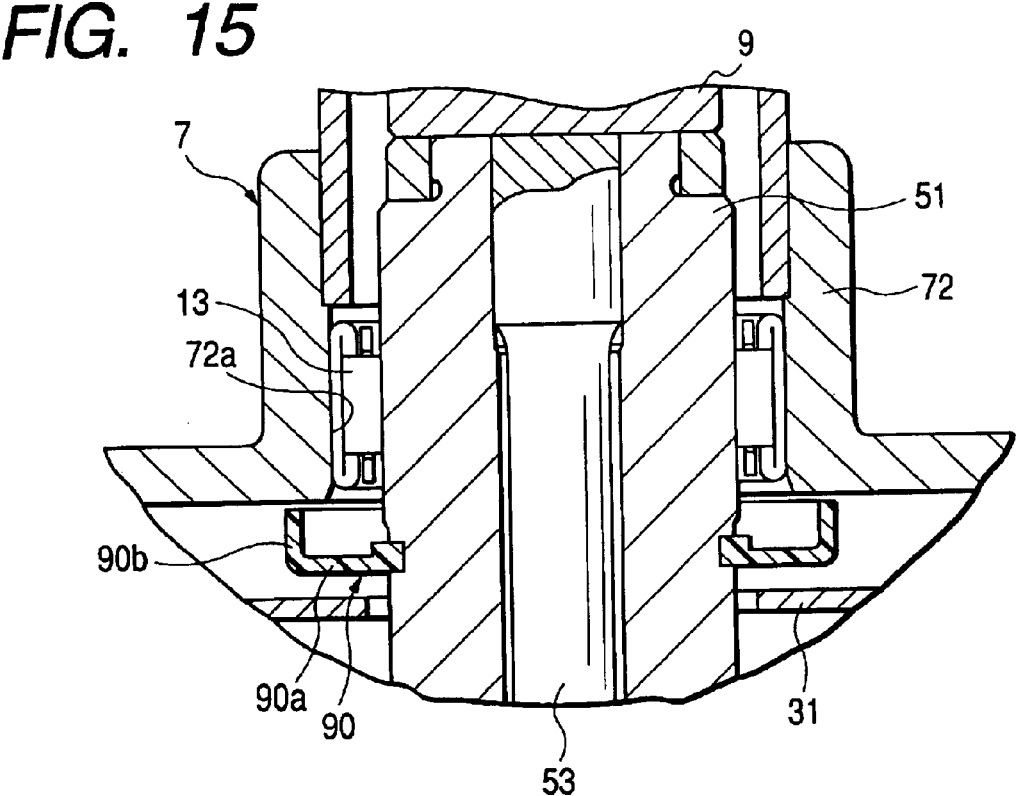
FIG. 15 is a partially enlarged view of FIG. 2 which shows an electric power steering device according to the sixth embodiment of the invention.

FIG. 15 is a partially enlarged view of FIG. 2 which shows the electric power steering device 1 according to the sixth embodiment of the invention.

A pan 90 is filled in an entire periphery of the input shaft 51. The pan 90 is formed by a cup-shaped cylinder made of an elastic material such as rubber and disposed between the bearing 13 and the control substrate 31. The pan 90 is made up of a disc-shaped bottom 90a and an annular side wall 90b extending substantially parallel to the longitudinal direction of the input shaft 51 to define a chamber with an opening oriented to the bearing 13. The pan 90 has an outer diameter which is greater than an inner diameter of an inner wall 72a of a bearing housing 72 that is defined by a hollow cylinder formed integrally with the cover 7. The whole of an open end of the pan 90 is located close to the inner wall of the cover 7.

The pan 90 serves to collect or store therein oil flowing out of the bearing 13 along the periphery of the input shaft 51 in order to preclude deposition of the oil over the circuit parts on the control substrate 31. The pan 90 is, as described above, greater in diameter than the bearing 13 and located close to the inner wall of the cover 7, so that it can receive all of drops of the oil scattered from the bearing 13 and/or the surface of the input shaft 51 during rotation of the input shaft 51. It is advisable that the chamber of the pan 90 have the depth enough to catch drops of the oil completely during rotation of the input shaft 51 at relatively high speeds.

In a case where there is no need of apprehension about direct flying of the oil from the bearing 13, the pan 90 may have the diameter smaller than the inner diameter of the inner wall 82a of the bearing housing 72.

Figure 16:
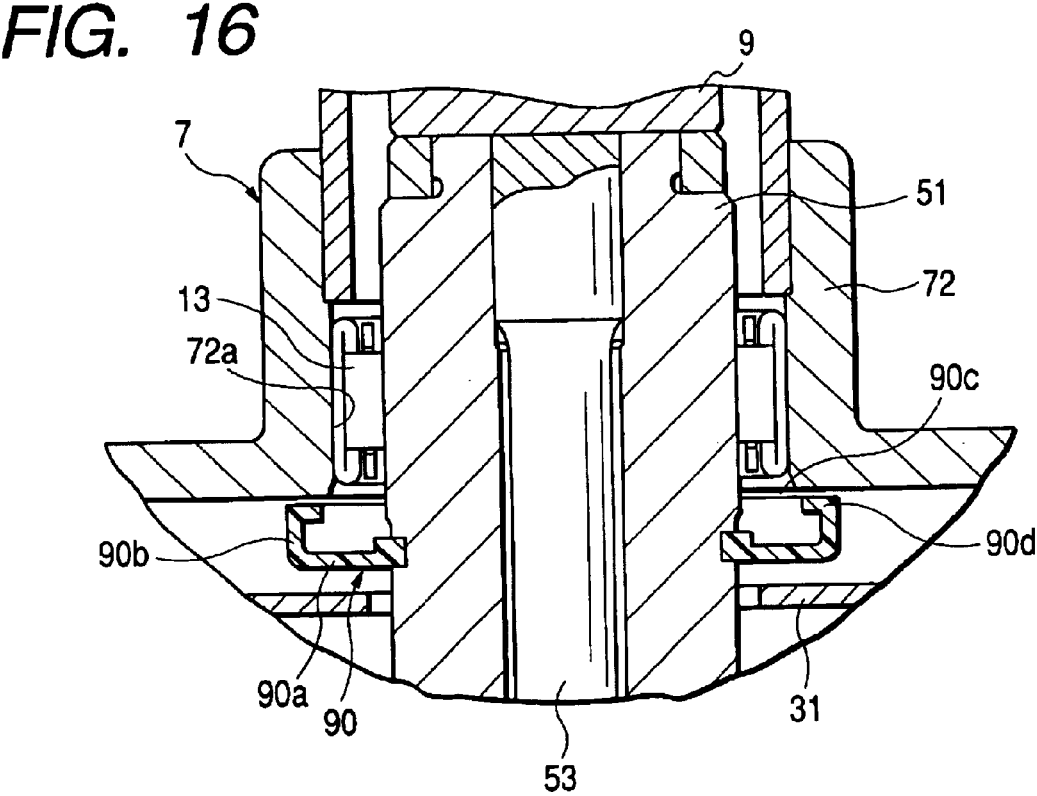
FIG. 16 is a partially enlarged view which shows a modified form of a pan affixed to an input shaft for storing oil leaking from a bearing.

FIG. 16 shows a modification of the pan 90.

The pan 90 has an annular cover 90d extending inwardly from the end of the side wall 90b to define an opening 90c. The opening 90c is smaller in diameter than the bottom 90a.

In the structure of FIG. 15, rotation of the pan 90 following rotation of the input shaft 51 may cause the oil within the pan 90 to fly over the side wall 90b outwardly. The cover 90d serves to avoid such an event.

An installation location of the capacitor 36 and beneficial effects offered thereby will be described below in detail.

Figure 17:
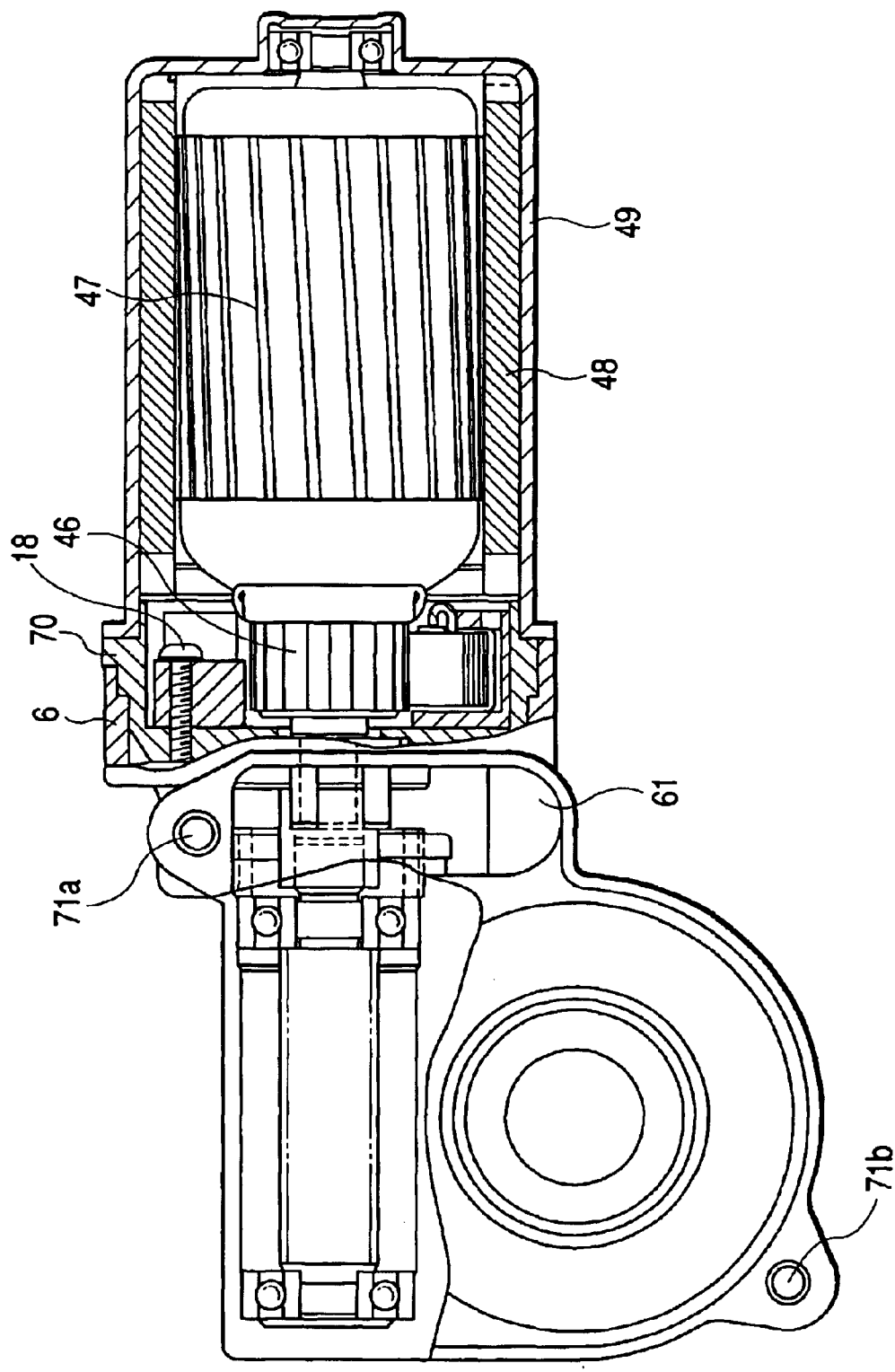
FIG. 17 is a partially sectional view as taken in a radius direction of the electric power steering device of FIG. 1.

The capacitor 36 is, as clearly shown in FIG. 4(b), of a cylindrical shape and has a length extending perpendicular to the armature shaft 45. Specifically, the capacitor 36 is oriented in parallel to the steering shaft, thereby permitting the capacitor 36 to be installed within the housing 6 without having to increase the size of the electric power steering device 1 in a radius direction of the steering shaft. The capacitor 36 is, as shown in FIGS. 5 and 17, disposed within a chamber 61 located within the housing 6 outside the diameter of the sleeve 16 and inside the diameter of the electric motor 4. In other words, the chamber 61 is defined between the input shaft 51 within the housing 6 and the electric motor 4. Usually, the armature shaft 45 is separate from the worm gear 55 and joined thereto through the sleeve 16, thus causing the chamber 61 to be defined inevitably outside the diameter of the sleeve 16. The installation of the capacitor 36 within the chamber 61 facilitates efficient use of an inner space of the housing 6 without need for increasing the size of the electric power steering device 1. The capacitor 36 is secured closely to the inner wall of the housing 6 through a filling material.

The housing 6 is made of an aluminum material and has, as described already, the support member 8 disposed therein. The housing 6 supports the output shaft 52 rotatably through the bearing 12. The capacitor 36 is affixed to the inner wall of the housing 6 through the filling material, thereby enhancing transmission of heat generated from the capacitor 36 to the housing 6, thus facilitating the dissipation of the heat from the capacitor 36. The inner wall of the housing 6 to which the capacitor 36 is affixed is round, that is, contoured to conform with the contour of the capacitor 36, thereby holding the capacitor 36 tightly free from mechanical vibrations applied thereto. This minimizes the stress acting on joints of the capacitor 36 and the control substrate 31, thus ensuring the reliability of an operation of the capacitor 36.

The capacitor 36, as can be seen from FIG. 5, may be located partially outside the diameter of the electric motor 4. In other words, most of the capacitor is preferably disposed inside the diameter of the electric motor 4.

The armature shaft 45 and the worm gear 55 may alternatively be formed integrally without use of the sleeve 16.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

What is claimed is:

1. An electric power steering device comprising:

an electric motor;

a controller including a switching transistor working to control a duty cycle of current and a control substrate to which the switching transistor is connected electrically, said controller determining a steering assist torque to be outputted from said electric motor as a function of a steering torque added to a steering shaft;

a torque transmission mechanism working to transmit the steering assist torque outputted from said electric motor to the steering shaft;

a shell within which said torque transmission mechanism is disposed; and a support member working to support the steering shaft and said controller, said support member being secured within said shell.

2. An electric power steering device as set forth in claim 1, wherein said support member has a hollow cylindrical protrusion extending in a longitudinal direction of the steering shaft, the hollowing cylindrical protrusion having an inner wall which supports the steering shaft rotatably through a bearing and an outer wall around which the control substrate is placed.

3. An electric power steering device as set forth in claim 1, further comprising a torque sensor installed on the steering shaft which works to measure the steering torque added to the steering shaft in a magnetic fashion, and wherein said support member has an inner peripheral surface facing the torque sensor, the inner peripheral surface having disposed thereon a magnetic collection member working to collect a magnetic flux produced from the torque sensor.

4. An electric power steering device as set forth in claim 1, wherein said controller controls the duty cycle of current supplied to said electric motor as a function of the determined steering assist torque to have said electric motor output the determined steering assist torque, wherein said shell is made of aluminum, and further comprising feeder lines connecting between said electric motor and the control substrate for feeding the current to said electric motor, said feeder lines being disposed within said shell.

5. An electric power steering device as set forth in claim 4, further comprising a motor housing within which said electric motor is disposed, said motor housing being joined to said shell so that joint of said electric motor and the feeder lines is located close to a joint of said controller and the feeder lines.

6. An electric power steering device as set forth in claim 5, wherein said torque sensor, said controller, said electric motor, and said torque transmission mechanism are disposed within said shell and said motor housing integrally.

7. An electric power steering device as set forth in claim 1, wherein said shell is made up of a housing to which said support member is secured and a cover closing an open end of said housing, and wherein said support member is placed in a nip formed between said housing and said cover laid to overlap with each other in a longitudinal direction of the steering shaft.

8. An electric power steering device as set forth in claim 1, wherein said switching transistor is installed on said support member.

9. An electric power steering device as set forth in claim 8, wherein said shell has formed on an inner wall thereof an extension extending in a radius direction of the steering shaft to cover a worm gear installed in said torque transmission mechanism working to reduce speed of said electric motor, and wherein said support member has an abutment portion abutting said extension of said shell.

10. An electric power steering device as set forth in claim 9, wherein said switching transistor is located in proximity to said abutment portion.

11. An electric power steering device as set forth in claim 10, wherein said switching transistor is installed on a surface of said support member substantially opposed to the abutment portion.

12. An electric power steering device as set forth in claim 1, wherein said support member has a first end and a second end which are opposed to each other in a longitudinal direction of the steering shaft, the first end having said controller mounted thereon, the second end having a worm gear of said torque transmission mechanism mounted thereon, and wherein said support member is in abutment of an entire periphery thereof to an inner wall of said shell.

13. An electric power steering device as set forth in claim 1, further comprising a torque sensor installed on the steering shaft which works to measure the steering torque added to the steering shaft, said torque sensor having a non-rotatable portion provided on an inner peripheral surface of said support member.

14. An electric power steering device as set forth in claim 1, wherein said steering shaft includes a first shaft, a second shaft, and an elastic member which joins the first and second shafts in alignment with each other and twists subjected to input of the steering torque to one of the first and second shafts, and further comprising a torque sensor including (a) a hard magnetic member which is joined to the first shaft and produces a magnetic field therearound, (b) a soft magnetic member which is joined to the second shaft, placed within the magnetic field to form a magnetic circuit, and works to change a density of magnetic flux produced in the magnetic circuit when the soft magnetic member is changed in relative position to the hard magnetic member due to twisting of the elastic member, (c) a pair of auxiliary soft magnetic members which is disposed close to the soft magnetic member, and (d) a magnetic sensor which works to measure a density of magnetic flux flowing between the auxiliary soft magnetic members as a function of the steering torque, and wherein one of the auxiliary soft magnetic members has a magnetic flux collecting portion which is opposed to the other auxiliary soft magnetic member in a radius direction of the steering shaft and functions to collect the magnetic flux from the soft magnetic member, and wherein the magnetic sensor is disposed between the magnetic flux collecting portion and said other auxiliary soft magnetic member.

15. An electric power steering device as set forth in claim 1, wherein said steering shaft includes a first shaft, a second shaft, and an elastic member which joins the first and second shafts in alignment with each other and twists subjected to input of the steering torque to one of the first and second shafts, and further comprising a torque sensor including (a) a hard magnetic member which is joined to the first shaft and produces a magnetic field therearound, (b) a soft magnetic member which is joined to the second shaft, placed within the magnetic field to form a magnetic circuit, and works to change a density of magnetic flux produced in the magnetic circuit when the soft magnetic member is changed in relative position to the hard magnetic member due to twisting of the elastic member, (c) a pair of auxiliary soft magnetic members which is disposed close to the soft magnetic member, and (d) a magnetic sensor which works to measure a density of magnetic flux flowing between the auxiliary soft magnetic members as a function of the steering torque, and wherein the auxiliary soft magnetic members have magnetic flux collecting portions, respectively, which are opposed to each other in a radius direction of the steering shaft and function to collect the magnetic flux from the soft magnetic member, and wherein the magnetic sensor is disposed between the magnetic flux collecting portions.

16. An electric power steering device as set forth in claim 14, wherein said auxiliary soft magnetic members are installed within a resinous mold with an opening, the resinous mold having formed therein a chamber within which said magnetic sensor is disposed, the chamber having a conical wall that increases in diameter toward the opening and serves as a guide for insertion of said magnetic sensor into the chamber when said magnetic sensor is installed within the chamber.

17. An electric power steering device as set forth in claim 15, wherein said auxiliary soft magnetic members are installed within a resinous mold with an opening, the resinous mold having formed therein a chamber within which said magnetic sensor is disposed, the chamber having a conical wall that increases in diameter toward the opening and serves as a guide for insertion of said magnetic sensor into the chamber when said magnetic sensor is installed within the chamber.

18. An electric power steering device as set forth in claim 14, wherein said magnetic sensor has terminals joined electrically to a substrate of said controller, and wherein said controller determines the steering assist torque as a function of the density of magnetic flux measured by said torque sensor.

19. An electric power steering device as set forth in claim 15, wherein said magnetic sensor has terminals joined electrically to a substrate of said controller, and wherein said controller determines the steering assist torque as a function of the density of magnetic flux measured by said torque sensor.

20. An electric power steering device as set forth in claim 18, wherein the substrate extends perpendicular to the terminals of said magnetic sensor.

21. An electric power steering device as set forth in claim 19, wherein the substrate extends perpendicular to the terminals of said magnetic sensor.

* * * * *